United States Patent
Van Duyne

[11] Patent Number: 5,748,513
[45] Date of Patent: May 5, 1998

[54] METHOD FOR INHARMONIC TONE GENERATION USING A COUPLED MODE DIGITAL FILTER

[75] Inventor: Scott A. Van Duyne, Stanford, Calif.

[73] Assignee: Stanford University, Stanford, Calif.

[21] Appl. No.: 699,126

[22] Filed: Aug. 16, 1996

[51] Int. Cl.$^6$ .............................. G06F 17/10; G10H 1/12
[52] U.S. Cl. .............................. 364/724.17; 84/661
[58] Field of Search .................. 364/724.17; 84/661

[56] References Cited

U.S. PATENT DOCUMENTS

| | | | |
|---|---|---|---|
| 5,136,917 | 8/1992 | Kunimoto | 84/624 |
| 5,256,830 | 10/1993 | Takeuchi et al. | 84/625 |
| 5,352,849 | 10/1994 | Kobayashi | 84/659 |
| 5,432,296 | 7/1995 | Takeuchi et al. | 84/661 |
| 5,466,884 | 11/1995 | Van Duyne et al. | 84/661 |
| 5,471,007 | 11/1995 | Van Duyne et al. | 84/622 |

OTHER PUBLICATIONS

Jaffe and Smith, Extensions of the Karplus–Strong Plucked–String Algorithm, CMJ vol. 7, No. 2 (1983), pp. 481–494.

Smith, Efficient Synthesis of Stringed Musical Instruments, Proc. ICMC, 1993, pp. 64–71.

Van Duyne and Smith, A Simplified Approach to Modeling Dispersion Caused by Stiffness in Strings and Plates, Proc. ICMC, 1994, pp. 407–410.

Van Duyne and Smith, Developments for the Commuted Piano, Proc. ICMC, 1995, pp. 319–326.

*Primary Examiner*—Tan V. Mai
*Attorney, Agent, or Firm*—Lumen Intellectual Property Services

[57] ABSTRACT

A coupled mode digital filter which simulates any number of arbitrarily tuned modes coupled together so as to share the same loss element at a junction loaded by an arbitrary impedance function is formed from the combination of one first order allpass filter [28] and one unit delay [30] per mode and one shared coupling filter[36]. This coupled mode digital filter may be excited by a stored or generated excitation signal, or a filtered excitation signal, to produce inharmonic percussive sounds and musically interesting two-stage and beating decay envelopes resulting from natural coupling of modes of near frequencies

17 Claims, 5 Drawing Sheets

METHOD FOR INHARMONIC TONE GENERATION USING A COUPLED MODE DIGITAL FILTER

FIELD OF THE INVENTION

This invention relates generally to techniques for digital synthesis of music. More particularly, it relates to the use of coupled mode digital filters to generate inharmonic musical tones.

BACKGROUND OF THE INVENTION

Many musical tones, such as plucked or struck strings, bells, plates, drums, and wood blocks, may be modeled as a sum of sinusoidal signals (modes), each controlled by an associated amplitude envelope. These amplitude envelopes, after initial excitation transients, generally decay at exponential rates. The decay rates are generally frequency dependent as well, with the higher frequency modes decaying more quickly than the lower frequency modes. Moreover, if there is coupling between any modes, there may be more complex two-stage, or beating decay envelopes.

Synthesizing sounds with a bank of enveloped oscillators added together is known as additive synthesis, and is effective for synthesizing a wide class of sounds. One difficulty with this method, however, is that the initial excitation transient portions of the amplitude envelopes may be quite diverse depending on the various different mallets, hammers, plucking means and different effort levels which are being simulated. Therefore, for each different excitation condition, a different set of amplitude envelopes must be generated, or stored, for high quality tone generation using this method.

In another method of tone synthesis, control of the excitation portion of the sound may be simplified by designing, rather than an oscillator bank, a resonant digital filter whose impulse response is a set of exponentially decaying sinusoids matching the desired frequencies and decay rates of the musical instrument being synthesized. The transient excitation portion of the sound may then be controlled by an excitation signal which may be used to drive the resonant digital filter and which controls those aspects of the sound quality which pertain to the excitation means. Theoretically, if the resonant digital filter is parameterized accurately as to partial frequencies and decay rates of the sound being modeled, then a precise excitation signal could be found to drive the resonant digital filter which would generate an output audio signal corresponding very closely to a recorded sound example from a real musical instrument.

It is known that resonant digital filters may be factored in a variety of ways for convenient implementation. For example, a feedback delay line loop implements a high order resonant system where the modes, or poles, of the system are tuned harmonically, that is, have integer relations to each other in frequency. For example, FIG. 1 shows a delay line loop having a delay 20 of length N samples, with a per period attenuation determined by a filter 22 characterized by a scalar g. Parameterization and design considerations for such structures are well known in the art and described, for example, by Jaffe and Smith in "Extensions of the Karplus-Strong Plucked-String Algorithm", Computer Music Journal, Vol. 7, No. 2, 1983.

The delay line loop model of FIG. 1, whose modes are harmonically related, may be extended to cover the case of stiff strings by inserting one or more first order allpass filters to simulate the stretching of modal frequencies over the spectrum, as explained in Van Duyne and Smith, "A Simplified Approach to Modeling Dispersion Caused by Stiffness in Strings and Plates", Proc. International Computer Music Conf., Aarhus, 1994. Although the modes of stiff strings are not exactly harmonic, they are very nearly so.

In U.S. Pat. No. 5,136,917, Kunimoto teaches the use of a particular kind of allpass filter inserted in a delay line loop to perturb the harmonicity of the modal frequencies. As shown in FIG. 2, the delay line loop contains an allpass filter 24 characterized by a transfer function $$H(z) = \frac{a + z^{-N}}{1 + az^{-N}},$$

where N>1. Although this modified delay line loop produces some inharmonic sounds as are found in some musical instruments, it is not able to produce general or arbitrary inharmonic sounds. In particular, it is constrained to a particular class of sounds and spectral mode distributions which may be achieved by varying the filter parameters N and a.

Because the modal frequency restrictions in delay line loop systems, such as that shown in FIG. 2, are too limiting, an alternative factoring of the resonant digital filter system may be appropriate. In general, any linear digital filter system may be factored into a product (FIG. 3) or sum (FIG. 4) of m biquadratic filters (biquads) 26(1), 26(2), ..., 26(m), the name taken from the two quadratic polynomials in the numerator and the denominator of the filter's transfer function. A general biquad filter may be computed according to the difference equation, $$y(n)=b_0x(n)+b_1x(n-1)+b_2x(n-2)-a_1y(n-1)-a_2y(n-2),$$

where n is the time sample index, x(n) is the input signal, y(n) is the output signal, and $b_0$, $b_1$, $b_2$, $a_1$, and $a_2$ are the five parameters which determine the frequency characteristics of the filter. A product of cascaded second order sections may be obtained from a general system by factoring the numerator and denominator of the full digital system and associating the pairs of conjugate factors. This cascaded structure is shown in FIG. 3. A sum of second order sections may be obtained through a partial fraction expansion of the full digital system. This parallel structure is shown in FIG. 4.

Inharmonic systems, such as most percussion instruments, may be conveniently modeled as sums of products of biquad filters in standard computer programming environments or on special purpose DSP chips, where the modal frequencies and decay rates are controlled by the biquad parameters. Alternatively, the multiply-free 2D digital waveguide mesh, as disclosed by Van Duyne and Smith in U.S. Pat. No. 5,471,007 may be used if an accurate physical model is desired and if it is possible to implement the system in parallel hardware.

The use of biquads to implement an arbitrary resonant digital filter, as illustrated in FIGS. 3 and 4, is theoretically quite general. On the other hand, this type of model is cumbersome, physically unintuitive, and, in particular, unnatural to parameterize when trying to simulate the behavior of systems with near frequency coupled modes, exhibiting two-stage, or beating decay envelopes. Furthermore, because modal decay rates have a regular and gradual dependence on frequency, specific control over the decay rates of all the individual modes is not necessary for many useful musical purposes, and therefore adds unnecessarily to the complexity of the implementation.

It is known in the art how to form and calibrate coupled delay loop structures simulating coupled string systems, constructed from nearly equally tuned feedback delay loops. See, in particular, Smith, "Efficient Synthesis of Stringed Musical Instruments", Proc. International Computer Music Conf., Tokyo, 1993; Van Duyne and Smith, "Developments for the Commuted Piano", Proc. International Computer Music Conf., Banff, 1995, which produce two-stage decay and beating decay as is characteristic of piano strings. In addition, Kobayashi in U.S. Pat. No. 5,352,849 teaches a coupled string simulating filter structure which contains "a plurality of loop circuits each including at least one delay element, wherein these loop circuits are connected together such that a signal picked up from one loop circuit is introduced into another loop circuit. This signal circulating through each loop circuit is delayed by a delay time which is controlled by a predetermined parameter corresponding to a desirable musical tone to be generated. In addition, an excitation signal, corresponding to the excitation vibration, is applied to at least one of the loop circuits. Preferably, the non-electronic musical instrument is a piano, so that the sound generating element is a string and the activating element is a hammer which strikes the string. Further, number of the loop circuits is set corresponding to the number of strings to be provided with respect to each key of the piano." These delay loop structures, however, only simulate coupled strings having harmonically related modes. They do not and can not simulate percussion instruments having arbitrary inharmonically related modes.

SUMMARY OF THE INVENTION

Accordingly, it is a primary object of the present invention to provide a musically useful resonant digital filter structure whose modes are not harmonically related, nor required to be nearly harmonically related, nor otherwise constrained in frequency distribution; and further, whose modes may be tuned arbitrarily in frequency, and whose modes will interact to simulate two-stage, or beating decay, envelopes in accordance with natural coupling between closely tuned modes. It is a further object of the present invention to provide such a resonant digital filter structure that is intuitive to control and computationally inexpensive to implement. Further objects and advantages will be apparent from the following description and accompanying figures.

The above objects and advantages are obtained by a coupled mode digital filter where loss is shared among the modes through one coupling filter, where natural frequency decay rates are determined automatically by the frequency characteristics of the coupling filter, and where two-stage, or beating decay rates occur naturally when modes are tuned near enough to each other to cause a natural coupling. Further, the coupled mode digital filter has a useful physical intuition, and has a computational complexity reduction over biquad filter structures. In particular, the invention requires the implementation of only one first order filter with one coefficient per mode, plus one coupling filter shared by all the modes, as compared with the prior art biquad structures which require one second order biquad filter per mode, each with up to five coefficients.

A preferred embodiment of the coupled mode digital filter simulates one percussion instrument with a set of arbitrary modes. In contrast to the prior art, it does not simulate a group of coupled strings, which have harmonically related modes.

A second embodiment extends the coupled mode digital filter structure to the coupling together of feedback delay loops with delay portions of length greater than one sample with inharmonically related frequency characteristics, or of feedback delay loops having partial frequencies which have themselves been made inharmonic by the insertion of various allpass filter structures. In contrast to the prior art, this inharmonic tone generating structure can produce many fine approximations to resonating inharmonic percussion sounds, which are not at all like the sound produced by a simulation of a set of coupled strings (as taught by Kobayashi, for example). The invention is further distinguished by the fact that it is a coupling of modes or groups of modes within one resonating body, and the modes may be excited together as one resonating body, e.g. as in a drum excited by a single strike. The prior art (e.g., Kobayashi), in contrast, teaches a coupling of individual resonators, as of piano strings joined to a soundboard.

DETAILED DESCRIPTION

Figure 5:
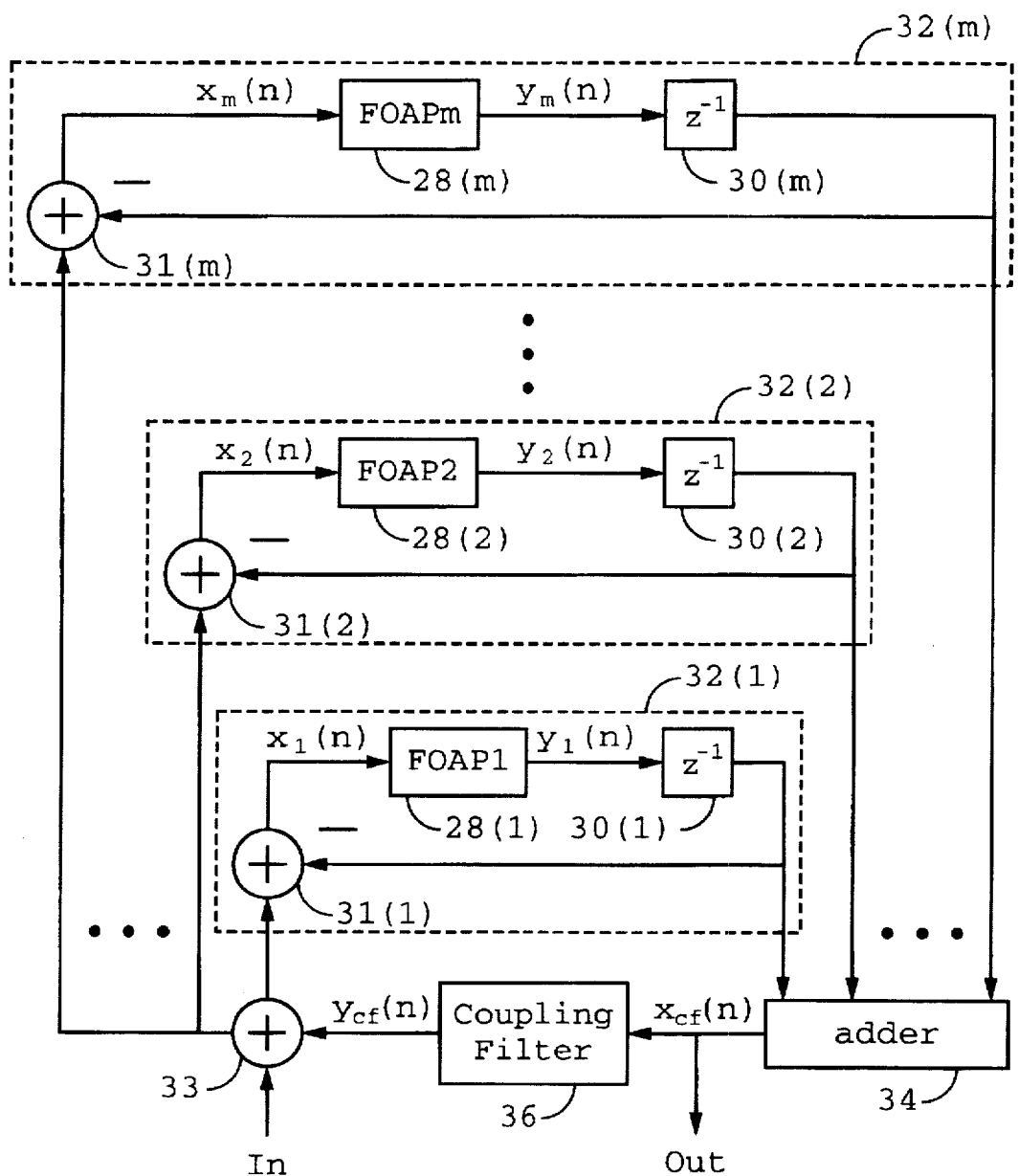
FIG. 5 shows a coupled mode digital filter according to the invention.

A block diagram of a preferred embodiment of the invention is shown in FIG. 5. It includes a collection of m first order allpass (FOAP) filters $28(1), 28(2), \ldots, 28(m)$ and a collection of m corresponding unit delay elements $30(1), 30(2), \ldots, 30(m)$. As shown in FIG. 5, the FOAP and unit delay pairs are arranged with corresponding adders $31(1), 31(2), \ldots, 31(m)$ to form a collection of m negative feedback loops $32(1), 32(2), \ldots, 32(m)$ corresponding to the m modes being simulated. As described in detail below, each of these loops forms a lossless oscillator having a characteristic resonant frequency, and is effectively a novel implementation of a second order filter.

In the preferred embodiment, the mode oscillator loops $32(1), 32(2), \ldots, 32(m)$ are initially excited by a common excitation input signal entering the circuit at an adder 33. Signals from loops $32(1), 32(2), \ldots, 32(m)$ are then coupled in an adder 34 which sends a coupled mode signal out of the circuit. The coupled mode signal is also sent to a coupling filter 36 which controls the decay envelope for the synthesized sound. The attenuated signal then passes through adder 33 and is fed back into the bank of m mode oscillator loops.

FOAP filters 28 have transfer functions of the form:

$$FOAP_1(z) = \frac{a_1 + z^{-1}}{1 + a_1 z^{-1}},$$

$$FOAP_2(z) = \frac{a_2 + z^{-1}}{1 + a_2 z^{-1}},$$

$$\vdots$$

$$FOAP_m(z) = \frac{a_m + z^{-1}}{1 + a_m z^{-1}}.$$

These m filters may be computed with a set of m corresponding difference equations, for example:

$$y_1(n) = a_1x_1(n) + x_1(n-1) - a_1y_1(n-1),$$
$$y_2(n) = a_2x_2(n) + x_2(n-1) - a_2y_2(n-1),$$
$$\vdots$$
$$y_m(n) = a_mx_m(n) + x_m(n-1) - a_my_m(n-1),$$

where n is the time sample index, $y_1(n), y_2(n), \ldots, y_m(n)$ are the respective output signals of filters 28(1), 28(2), ..., 28(m), and $x_1(n), x_2(n), \ldots, x_m(n)$ are the respective input signals of the filters. The FOAP coefficients, $a_1, a_2, \ldots, a_m$, determine the tuning of the m modal frequencies of the coupled mode digital filter. In the non-decaying case, where the coupling filter will have a gain of 0 for all frequencies, the correct tuning of the resonant modes may be determined as follows.

Consider a single negative feedback loop containing a FOAP filter with transfer function $$FOAP(z) = \frac{a + z^{-1}}{1 + az^{-1}}$$

and a delay element with transfer function $$D(z) = z^{-1}.$$

The transfer function of the entire loop for the mode is then $$M(z) = \frac{D(z)FOAP(z)}{1 + D(z)FOAP(z)}.$$

Substituting the expressions for D(z) and FOAP(z) and simplifying, one obtains $$M(z) = \frac{z^{-1}(a + z^{-1})}{1 + 2az^{-1} + z^{-2}}.$$

To tune this loop to a normalized radian frequency $\theta$, i.e. to place the resonant poles on the unit circle at phase $\theta$, one must have the zeroes of the denominator at $z = e^{\pm i\theta}$. Substituting this value of z in the equation $1 + 2az^{-1} + z^{-2} = 0$ and solving yields $$a = -\cos(\theta).$$

Therefore, a loop implemented with a sampling period T will have resonant modes at a frequency f if one sets $\theta = 2\pi fT$, so that $$a = -\cos(2\pi fT).$$

Accordingly, the tuning of the resonant modes is achieved by setting the FOAP filter coefficients to $$a_1 = -\cos(\theta_1),$$
$$a_2 = -\cos(\theta_2),$$
$$\vdots$$
$$a_m = -\cos(\theta_m),$$

where $\theta_1, \theta_2, \ldots, \theta_m$, are the m normalized radian frequencies, corresponding to m respective resonant modes at frequencies $f_1, f_2, \ldots, f_m$.

In the lossy case, these values for $a_1, a_2, \ldots, a_m$ are still sufficiently accurate for many musical purposes, though a precise tuning of the coefficients may be found through more elaborate mathematical analysis of the system modes. The choice of modal frequencies may be determined from analysis of real sounds, or by any arbitrary means.

In the lossy case, the adjustment of coupling filter 36 requires special consideration. Note that in the single mode case, the open loop transfer function T(z) may be written as $$T(z) = -z^{-1}FOAP(z)(1 - CF(z)),$$

where CF(z) is the transfer function of coupling filter 36. With coupling filter gain near 0, therefore, the modal loop is nearly lossless, and the mode will ring out for a longer time. If the coupling filter is a small positive gain, such as 0.001, then the mode will attenuate.

In general, we may have a desired set of different attenuation rates $A_1, A_2, \ldots, A_m$, corresponding to the m modes which are coupled together as in FIG. 5. Given this set of attenuations per sample (whose values, generally, are just slightly less than 1.0), we require a filter, L(z), whose magnitude response approximates the values $A_1, A_2, \ldots, A_m$, at the respective modal frequencies, $\theta_1, \theta_2, \ldots, \theta_m$, that is, $$L(e^{i\theta_k}) \approx A_k, \text{ for } k = 1, 2, \ldots, m.$$

It is known in the art how to find such an L(z) in the case of a set of coupled strings. In particular, Van Duyne and Smith derived a coupling filter calibration method for coupled strings in "Developments for the Commuted Piano", Proc. International Computer Music Conf., Banff, 1995. Since the mathematical calibration approach used in that paper is also applicable (to a reasonable approximation) to the present case, one can find the filter L(z) in the present case using these known techniques.

Once L(z) is determined, the coupling filter transfer function is calculated from L(z) as:

$$CF(z) = \frac{2(1 - L(z))}{(m + 1) + (m - 1)L(z)},$$

where m is the number of modes.

In general, any filter L(z) whose gain is nowhere greater than 1.0 may be converted to CF(z) as in the above equation and used safely in the structure shown in FIG. 5.

One approach is to set L to be a first order lowpass filter of the form:

$$L(z) = \frac{g(1-p)}{(1-q)} \cdot \frac{1 - qz^{-1}}{1 - pz^{-1}},$$

where p is the pole position, q is the zero position, and g is the gain at DC (or, equivalently in this case, the maximum gain of the filter). By combining these last two equations, we may find CF(z) in terms of m, p, q, and g, and compute it as the following first order difference equation:

$$y_{cf}(n) = g_{cf}[x_{cf}(n) + b_{cf} x_{cf}(n-1)] - a_{cf} y_{cf}(n-1),$$

where n is the time sample index, $x_{cf}(n)$ is the input signal to the coupling filter, $y_{cf}(n)$ is the output signal from the coupling filter, and $g_{cf}$, $a_{cf}$ and $b_{cf}$ are coupling filter parameters computed in terms of p, q, g and m, as follows:

$$g_d = 2 \frac{-1+q+g-pg}{-1+q-g+pg-m+qm+gm-pgm},$$

$$a_d = \frac{p-pq+qg-pqg+pm-pqm-qgm+pqgm}{-1+q-g+pg-m+qm+gm-pgm},$$

$$b_d = \frac{p-pq-qg+pqg}{-1+q+g-pg}.$$

The value of g should be less than 1.0, but usually very near to 1.0. It represents the attenuation per sample of the modal frequencies when p=q=0. Letting p and q vary slightly from 0 produces frequency dependent decay. More generally, p and q may take on any values between −1.0 and +1.0, provided q is not greater that p (otherwise the filter is not stable). The parameters g, p, and q are musically intuitive controls for decay rate, and frequency dependent decay rate roll-off. Sliding these parameters around creates many natural sounding decay configurations. Of course, in general, those sufficiently skilled in the art may construct L(z) or CF(z) by a variety of means and alternative filter orders and structures.

Figure 6:
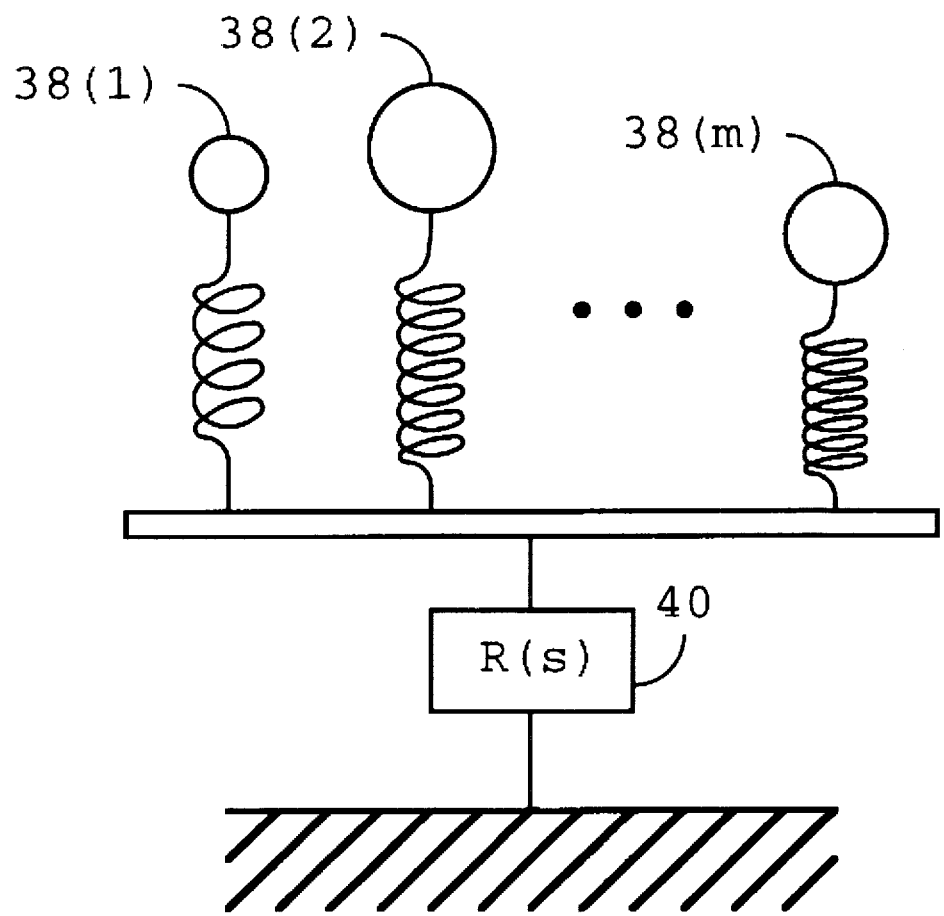
FIG. 6 shows a mechanical interpretation of the digital filter in FIG. 5.

The coupled mode digital filter shown in FIG. 5 can be viewed as a correct simulation of a mechanical system including a collection of m mass-spring oscillators coupled together at a loaded junction 40 having impedance R(s), as shown in FIG. 6.

In light of this mechanical interpretation, the coupling filter in the coupled mode digital filter shown in FIG. 5 may be designed and parameterized by assuming a load at the coupling point, R(s), and following methods known in the general theory of transmission lines coupled at a lumped impedance. In particular, $$CF(z) = \frac{2}{m+R(z)},$$

where R(z) is a discrete time representation of any positive real impedance function, and m is the number of coupled modes, which are presumed to have equal reference wave impedances in the above formulation. This known technique is explained in Smith, "Efficient Synthesis of Stringed Musical Instruments", Proc. International Computer Music Conf., Tokyo, 1993, as well as in any general text on the theory of transmission lines coupled at a lumped impedance.

The resonant filter structure of the present invention is typically driven by an excitation signal which enters the circuit at adder 33 in FIG. 5. The excitation signal has a characteristic depending on the nature of the physical excitation means that the circuit is intended to simulate. It is clear that almost any excitation signal would be appropriate to use, for a variety of musical sounds. One useful example of an excitation signal is a noise burst, or a pulse that has been band limited by subsequent filtering. In particular, a strike velocity dependent filtering of exponentially decaying noise, with or without an independent time-varying filtering of the noise, is a useful excitation signal. See, for example, the piano hammer structure taught in U.S. patent application, "Efficient Synthesis of Musical Tones having Nonlinear Excitations", Ser. No. 08/438,744.

In addition to being viewed as an inharmonic tone generator, the resonant filter structure of the present invention may be viewed also as a modally tuned reverberator. Accordingly, it may be used as a musical instrument body resonator. In other words, one may play a pre-existing musical sound through the resonant filter structure to modify the character of the sound according to the tuning and coupling parameters of the resonant filter structure. In particular, a pre-existing plucked or bowed string tone signal might be used as an excitation signal to a coupled mode digital filter whose modal frequencies and associated decay rates have been calibrated according to the modal frequencies and associated decay rates of a guitar body, or of a violin body, thereby simulating the special reverberation characteristics of a given musical instrument body.

Note that a passive nonlinear resonator may be formed from the filter structure of FIG. 5 by replacing one or more of the first order allpass filters 28(1), 28(2), . . . . 28(m) with first order nonlinear allpass filters, as described by Van Duyne, Pierce and Smith in "Traveling Wave Implementation of a Lossless Mode-Coupling Filter and the Wave Digital Hammer", Proc. ICMC, Aarhus, 1994. Such a replacement can lead to some simplified nonlinear percussion instrument tone simulations, such as those of gongs and cymbals.

Another method of simulating nonlinear energy transfer between modes is to retain the linear structure of the coupled mode digital filter of FIG. 5, but to use an extended excitation signal. For example, one can excite the filter of FIG. 5 with a noise signal having a long exponential decay with or without a time varying filtering that makes the bandwidth of the excitation broaden over time. Such an excitation generates a gong or cymbal like tone, or a bell-like tone with an enlivened evolution of tone quality. The invention thus provides a linear method of simulating some nonlinear effects.

Figure 1:
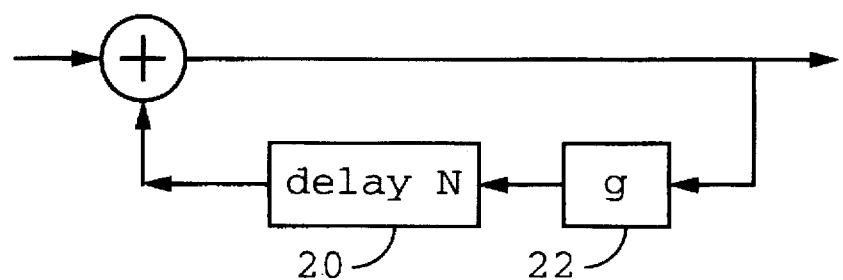
FIG. 1 shows a prior art feedback delay line loop.
Figure 2:
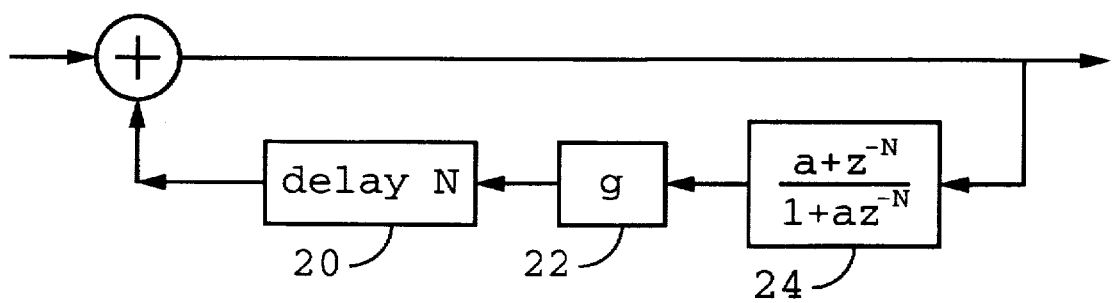
FIG. 2 shows a prior art feedback delay line loop with an allpass filter inserted in the loop.
Figure 3:
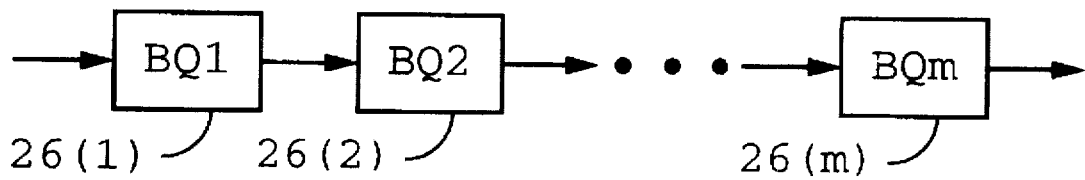
FIG. 3 shows a bank of cascaded biquad filters as is typical in the prior art.
Figure 4:
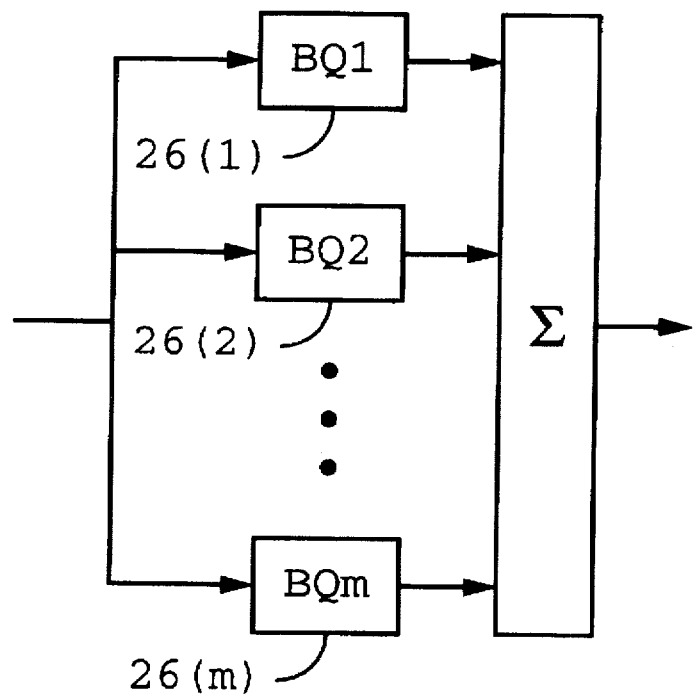
FIG. 4 shows bank of parallel biquad filters as is typical in the prior art.
Figure 7:
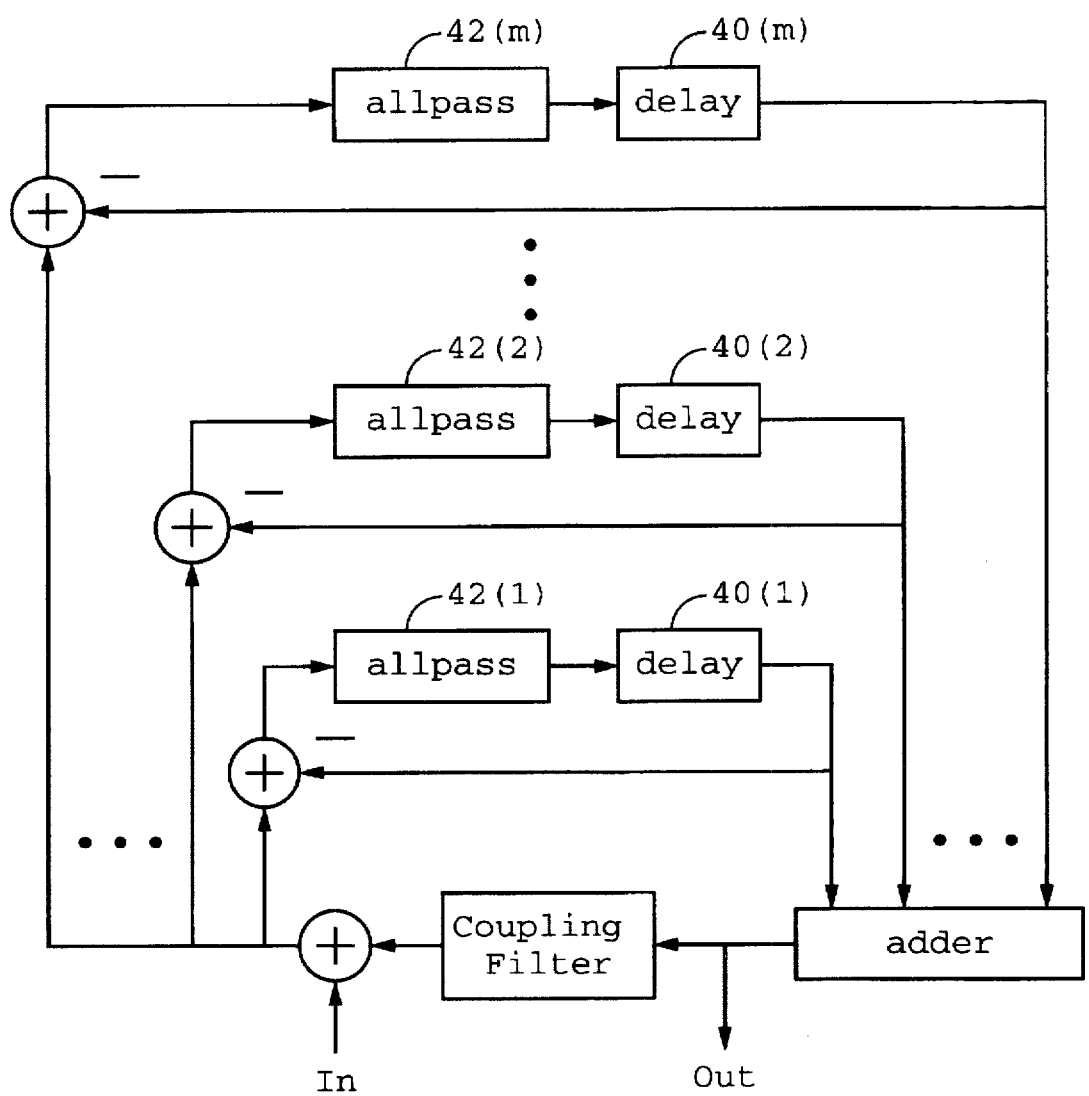
FIG. 7 shows an alternate embodiment of the coupled mode digital filter of the invention.

FIG. 7 shows an alternate embodiment which differs slightly from that shown in FIG. 5. In FIG. 7 delays 40(1), 40(2), . . . . 40(m) are not all necessarily of unit length, and allpass filters 42(1), 42(2), . . . , 42(m) are not necessarily first order. Thus, the coupled mode digital filter of FIG. 7 couples together inharmonically related loops representing both single modes (in the case of delays of length one) and groups of inharmonically related partial frequencies (in the case of delays of length greater than one). This embodiment is useful in cases where some of the modal frequencies to be simulated may be grouped together in delay line feedback loops such as those shown in FIGS. 1 and 2. In this way, some efficiency may be gained over the first embodiment.

It will be clear to one skilled in the art that the above embodiment may be altered in many ways without departing from the scope of the invention. Accordingly, the scope of the invention should be determined by the following claims and their legal equivalents.

What is claimed is:

1. A coupled mode digital filter comprising:

a mode oscillator loop comprising a allpass filter and a delay, wherein the allpass filter is in series with the delay, wherein the mode oscillator loop is a negative feedback loop, and wherein the mode oscillator loop has a resonant mode at frequency f; and a coupling filter adapted to attenuate signals at frequency f by a predetermined attenuation factor;

wherein the mode oscillator loop and the coupling filter are connected in series to form a positive feedback closed loop structure.

2. The filter of claim 1 wherein the first order allpass filter has a transfer function of the form $$FOAP(z) = \frac{a+z^{-1}}{1+az^{-1}},$$

where a is a predetermined filter parameter.

3. The filter of claim 2 wherein the mode oscillator loop has a transfer function $$M(z) = \frac{z^{-1}(a + z^{-1})}{1 + 2az^{-1} + z^{-2}},$$

where a is a predetermined filter parameter.

4. The filter of claim 2 wherein $$a = -\cos(2\pi fT),$$

where T is a sampling period of an implementation of the filter.

5. The filter of claim 1 further comprising a delay line feedback loop in parallel with the mode oscillator loop, wherein the delay line feedback loop comprises an allpass filter and a delay of length greater than one.

6. The filter of claim 1 wherein the first order allpass filter is a first order nonlinear allpass filter.

7. A coupled mode digital filter comprising:
   a collection of m mode oscillator loops comprising respective m first order allpass filters and respective m unit delays, wherein the mode oscillator loops have respective m resonant modes at frequencies $f_1, f_2, \ldots, f_m$; and
   a coupling filter adapted to attenuate signals at s frequencies $f_1, f_2, \ldots, f_m$, by predetermined attenuation factors $A_1, A_2, \ldots, A_m$;
   wherein the coupling filter and the collection of m mode oscillator loops form a closed loop structure.

8. The filter of claim 7 further comprising an adder adapted to couple signals from the m mode oscillator loops and send a coupled mode signal to the coupling filter.

9. The filter of claim 7 wherein the mode oscillator loops are negative feedback loops.

10. The filter of claim 7 wherein the closed loop structure is a positive feedback loop.

11. The filter of claim 7 wherein the m first order allpass filters have transfer functions of the form $$FOAP_1(z) = \frac{a_1 + z^{-1}}{1 + a_1 z^{-1}},$$

$$FOAP_2(z) = \frac{a_2 + z^{-1}}{1 + a_2 z^{-1}},$$

$$\vdots$$

$$FOAP_m(z) = \frac{a_m + z^{-1}}{1 + a_m z^{-1}},$$

where $a_1, a_2, \ldots, a_m$, are predetermined filter parameters.

12. The filter of claim 11 wherein $$a_1 = -\cos(2\pi f_1 T),$$
$$a_2 = -\cos(2\pi f_2 T),$$
$$\vdots$$
$$a_m = -\cos(2\pi f_m T),$$

where T is a sampling period of an implementation of the filter.

13. The filter of claim 7 further comprising a delay line feedback loop in parallel with the mode oscillator loops, wherein the delay line feedback loop comprises an allpass filter and a delay of length greater than one.

14. The filter of claim 7 wherein at least one of the first order allpass filters is a first order nonlinear allpass filter.

15. The filter of claim 7 wherein the coupling filter has a transfer function of the form $$CF(z) = \frac{2(1 - L(z))}{(m+1) + (m-1)L(z)},$$

where $L(z)$ has a magnitude response that approximates the values $A_1, A_2, \ldots, A_m$, at the respective frequencies, $f_1, f_2, \ldots, f_m$.

16. The filter of claim 15 wherein $$L(z) = \frac{g(1-p)}{(1-q)} \frac{1 - qz^{-1}}{1 - pz^{-1}},$$

where p, q and g are predetermined coupling filter parameters.

17. The filter of claim 7 wherein the coupling filter has a transfer function of the form $$CF(z) = \frac{2}{m + R(z)},$$

where $R(z)$ is a discrete time representation of a positive real impedance function.

* * * * *